Nov. 11, 1930.   H. E. NORVIEL   1,781,242
ILLUMINATED INSTRUMENT PANEL
Original Filed June 12, 1923   6 Sheets-Sheet 4

Patented Nov. 11, 1930

1,781,242

UNITED STATES PATENT OFFICE

HARRY E. NORVIEL, OF ANDERSON, INDIANA, ASSIGNOR, BY MESNE ASSIGNMENTS, TO A C SPARK PLUG COMPANY, OF FLINT, MICHIGAN, A CORPORATION OF MICHIGAN

ILLUMINATED INSTRUMENT PANEL

Application filed June 12, 1923, Serial No. 645,007. Renewed May 12, 1930.

This invention relates to illuminated instrument panels and more particularly to that type of panel adapted for use in connection with motor vehicles.

It is among the objects of the present invention to provide for the illumination of one or more instruments in such a manner as to be the least tiring to the eye of the observer.

In order to attain these aims, the present invention comprises an instrument panel including a plurality of independently mounted indicating instruments illuminated by a single electric lamp, constructed in such a manner that the illumination of the instrument dials only is visible, direct illumination of other visible parts of the panel, such as the apertured plate or dial cover and the glass cover, being prevented.

Other and further objects and advantages of the present invention will be apparent from the following description, reference being had to the accompanying drawings, wherein a preferred form of embodiment of the invention is clearly disclosed.

Figure 5:
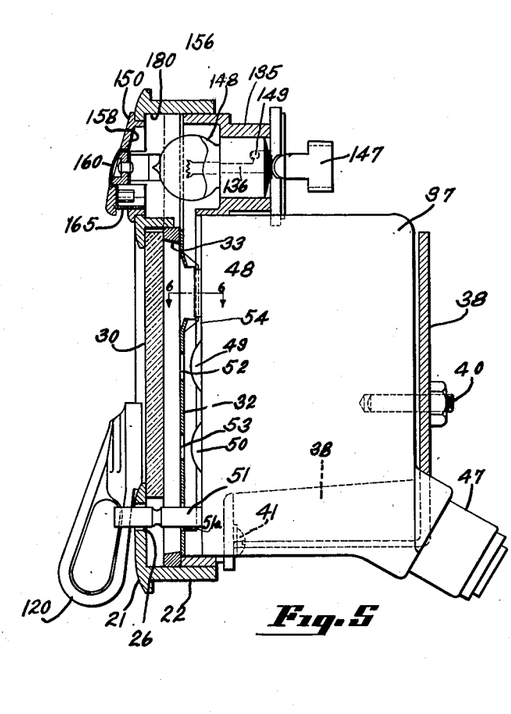
Fig. 5 is a sectional view taken on the line 5—5 of Fig. 1.
Figure 7:
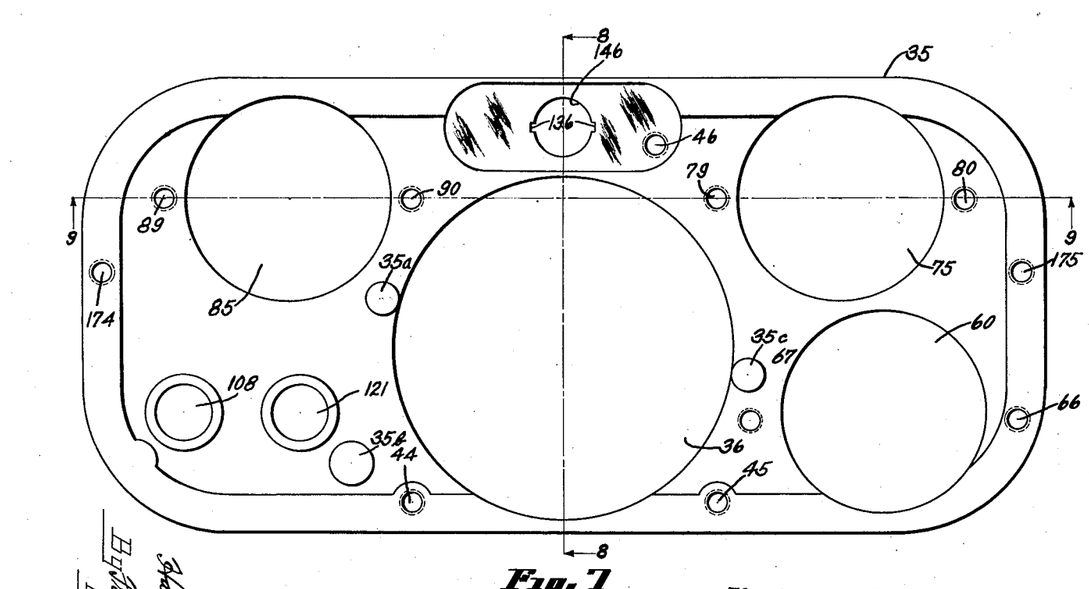
Fig. 7 is a front view of the frame.
Figure 8:
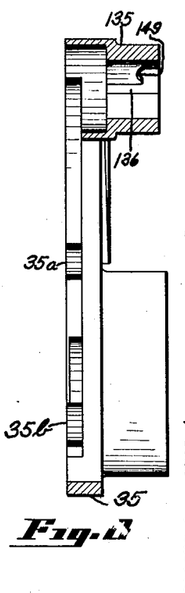
Fig. 8 is a sectional view taken on the line 8—8 of Fig. 7.
Figures 12, 13, 14, 15:
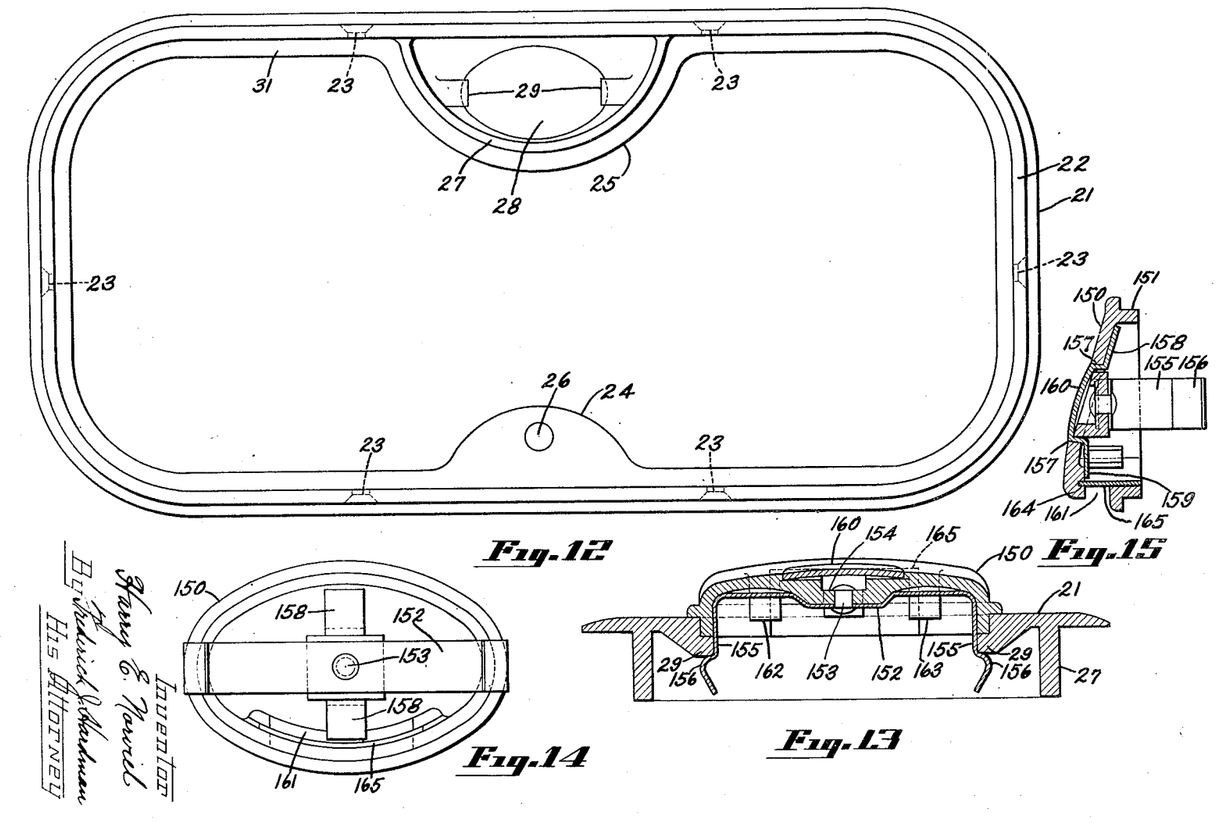
Fig. 12 is a rear view of the bezel ring.
Fig. 13 is a fragmentary sectional view taken on the line 13—13 of Fig. 1.
Fig. 14 is a rear view of the cap unit shown in Fig. 13.
Fig. 15 is a vertical mid-sectional view of the cap unit.

In the drawings, the instrument panel or case 20 comprises a substantially rectangular bezel ring 21, see Fig. 12, provided with a flange 22 through which screw holes 23 are bored and countersunk, adjacent the top edge of said flange. The bezel ring 21 is provided with inwardly extending semi-circular shaped portions 24 and 25. Hole 26 passes substantially centrally through the portion 24. Portion 25 is provided with a flange 27, an elliptically shaped aperture 28 and inwardly extending shoulders 29. A pane of glass 30, provided with semi-circular notches corresponding with the portions 24 and 25, is adapted to rest against the portion 31, the edges of the glass fitting within the flanges 22 and 27. The notch in the glass adjacent the portion 24 is adapted to rest on the portion 24, leaving the hole 26 unobstructed. A dial cover 32 is held in spaced relation to glass 30 by spacing ring 33 (Fig. 5). Frame 35 is adapted to fit within the flange 22 of the bezel ring 21 and to be held by screws which pass through holes 23 and engage tapped holes in the edge of frame 35. Thus the frame 35 tends to hold securely in place the glass 30, spacing ring 33 and dial cover 32, said dial cover 32 being spaced from the front surface of frame 35 by spacing bosses 35$^a$, 35$^b$ and 35$^c$.

Frame 35 is provided with an aperture 36 receiving a speedometer 37. This speedometer is secured to a substantially triangular shaped bracket 38 by bolts 39 and 40, and bracket 38 is secured to the frame 35 by screws 41, 42 and 43 which engage with tapped holes 44, 45 and 46 respectively located in the frame 35. Speedometer 37 is provided with a coupling 47 to which a speedometer drive shaft may be connected. The speedometer is provided with speed indicator wheel 48, total mileage indicator wheel 49 and trip mileage indicator wheel 50.

Figures 4, 6:
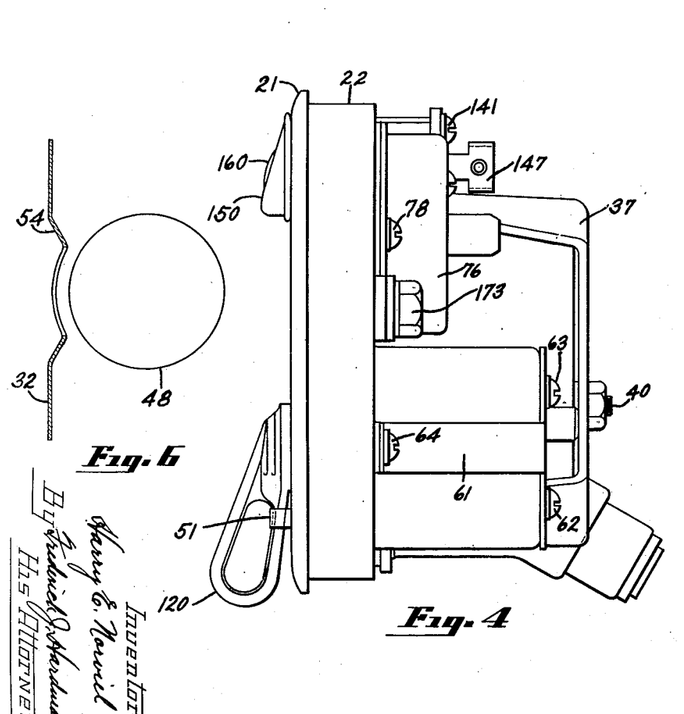
Fig. 4 is an end view of the instrument panel looking in the direction of arrow 4 in Fig. 1.
Fig. 6 is a fragmentary sectional view taken on the line 6—6 of Fig. 5.

These wheels extend into the space between dial cover 32 and the front face of frame 35. Speedometer reset pin 51 passes through an aperture 51ª in dial cover 32 and through hole 26 in portion 24 of bezel ring 21. Indicator wheels 49 and 50 are visible through adjacent sight openings 52 and 53, respectively, in dial cover 32. Dial cover 32 is provided with a depression 54, centrally of which is located an opening 55 below which is a preferably white index 56. This depression is shaped to conform with the surface of wheel 48 (see Fig. 6). The speed indicator wheel 48 is visible through sight opening 55 in the dial cover 32, the index 56 pointing to indicating figures on wheel 48.

Aperture 60 in frame 35 is adapted to receive a gasoline gauge attached to a bracket 61 by screws 62 and 63. Bracket 61 is attached to a frame 35 by screws 64 and 65 which engage tapped holes 66 and 67, respectively, in frame 35. A Bowden wire is adapted to be connected with the gasoline gauge through connection 68. The gasoline gauge indicator 69 is visible through sight opening 70 in the dial cover 32 below which is a preferably white index 71, which points to indicating figures on the indicator 69.

Aperture 75 in frame 35 is adapted to receive an oil gauge 76, attached to the frame by screws 77 and 78 which engage tapped holes 79 and 80, respectively, in frame 35. The dial of the oil gauge is visible through sight opening 81 in dial cover 32.

Aperture 85 in frame 35 is adapted to receive an ampere meter 86 which is attached to the frame by screws 87 and 88 which engage tapped holes 89 and 90, respectively, in frame 35. Terminals 91 and 92 are provided for circuit connections. The dial of the ampere meter 86 is visible through sight opening 93 in the dial cover 32.

A combined ignition and lighting switch base 95 of non-conducting material is attached to the substantially oval flange 95ª of frame 35 by screws 96, 97 and 98 which engage with tapped holes 99, 100 and 101, respectively, in frame 35. Contacts 102, 102ª and 103 pass through the switch base 95 and are connected outside the base by a conducting strip 104. Terminal 105 is secured to this strip 104 and to a contact which passes through base 95 and is adapted to receive a circuit connection leading from a source of current such as a battery. Terminal 106 is connected with a contact which passes through the base 95 and a circuit connection from an ignition coil is adapted to be attached to this terminal. The hub 107ª of ignition lever 107 passes through aperture 108 in base 35, and a spider 109, having fingers 110 and 111, is attached to the inner end thereof in a manner described in the copending application of H. E. Norviel, Serial No. 535,920, filed February 11, 1922. Fingers 110 and 111 cooperate with contacts 102 and 106, respectively, when the ignition lever 107 is rotated to the left, as viewed in Fig. 1, to establish the circuit connections between the battery and the ignition coil.

Terminal 115 connects with a contact which passes through the base 95 and is adapted for circuit connection with the head lamps. Terminal 116 connects with a contact which passes through the base 95 and is connected with terminal 115 by dimmer resistance 117. Contact 118 passes through the base 95 and is connected through conducting strip 118ª with terminal 119 which is adapted to have circuit connection with the tail light circuit. The hub of lighting lever 120 passes through aperture 121 in frame 35 and the spider, having fingers 123, 124, 125 and 126 is attached to the inner end thereof. When switch lever 120 is turned clockwise as viewed in Fig. 1, or counterclockwise as viewed in Fig. 2, finger 123 will engage contact 118, finger 124 will engage contact 103, finger 125 will engage the insulating base 95 and finger 126 will engage the contact connected with terminal 115. Thus the head and tail light circuits will be established, with the head lights burning brightly. When the lever 120 is turned counterclockwise, as viewed in Fig. 1, or clockwise as viewed in Fig. 2, finger 123 will engage the contact connected with terminal 116, finger 124 will engage the contact connected with terminal 119, finger 125 will engage contact 103 and finger 126 will engage the base 95. Thus a circuit will be established from contact 103, through finger 125, finger 124, terminal 119, finger 123, terminal 116, dimmer resistance 117, terminal 115 to the head lamps. In this manner the dial cover and frame 35, the head and tail light circuits will be established with the head lights burning dim.

The co-pending application of H. E. Norviel referred to shows means for indexing, by means of a ratchet and spring pressed plunger, each of the lighting and ignition switches. Preferably, this means comprises a ratchet plate 112 secured to each switch handle hub and provided with a corrugated periphery adapted to be engaged by a spring pressed ball 112 received by a recess 114, see Fig. 3.

Figures 2, 3, 16:
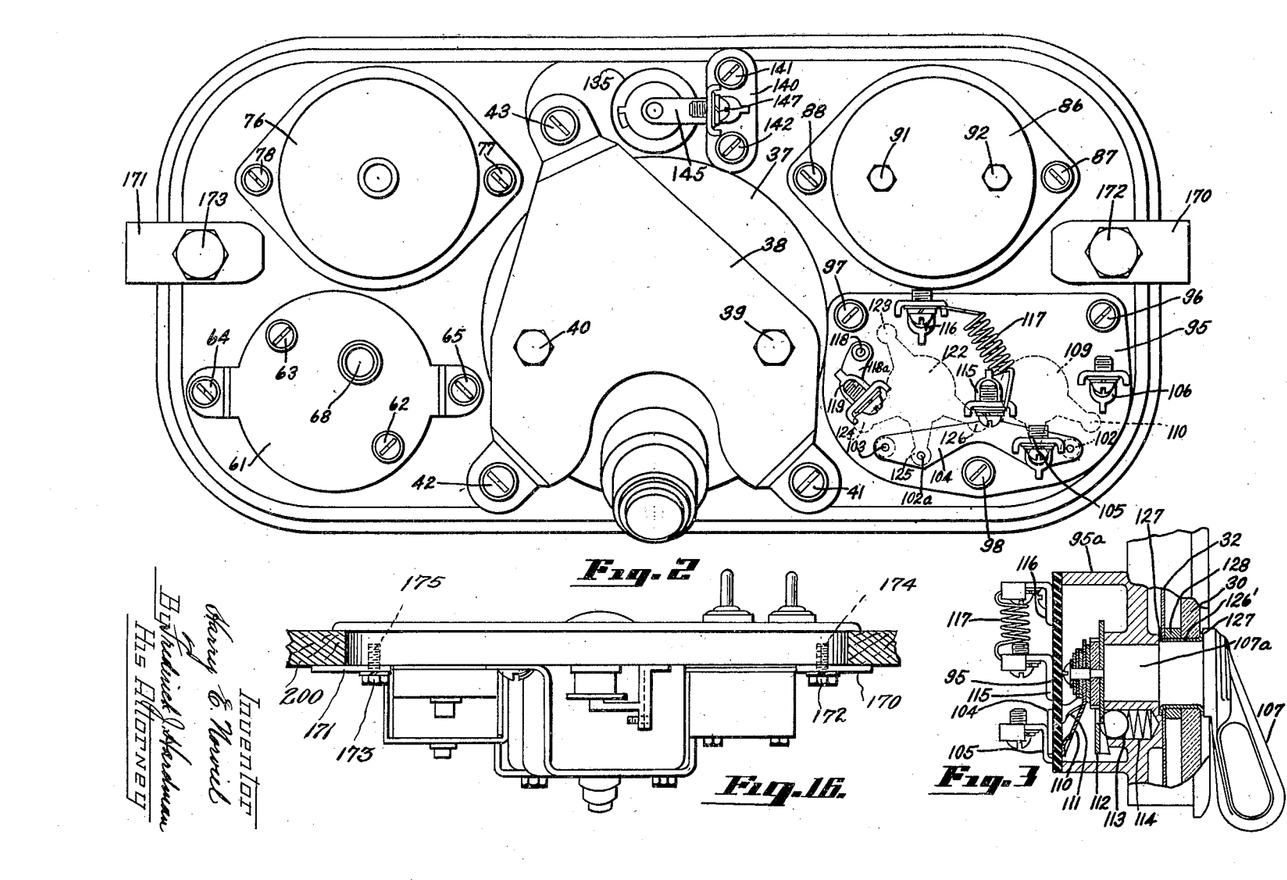
Fig. 2 is a back view thereof.
Fig. 3 is a sectional view taken on line 3—3 of Fig. 1.
Figure 16 is a view showing my panel applied to the instrument board of an automobile.

Fig. 3 shows also means for securing together the glass pane 30 and the dial cover 32 in such a manner to prevent the entrance of dirt from around the switch handle hubs into the space between the glass and dial cover. This means includes a ferrule 126' having flanges 127 between which are clamped the dial cover 32, a spacing washer 128 and the glass cover 30.

With the exception of the speedometer wheels 48, 49 and 50 which project slightly into the space between the front face of frame 35 and dial cover 32 the front faces of all these instruments are substantially flush with the front face of frame 35.

Figure 10:
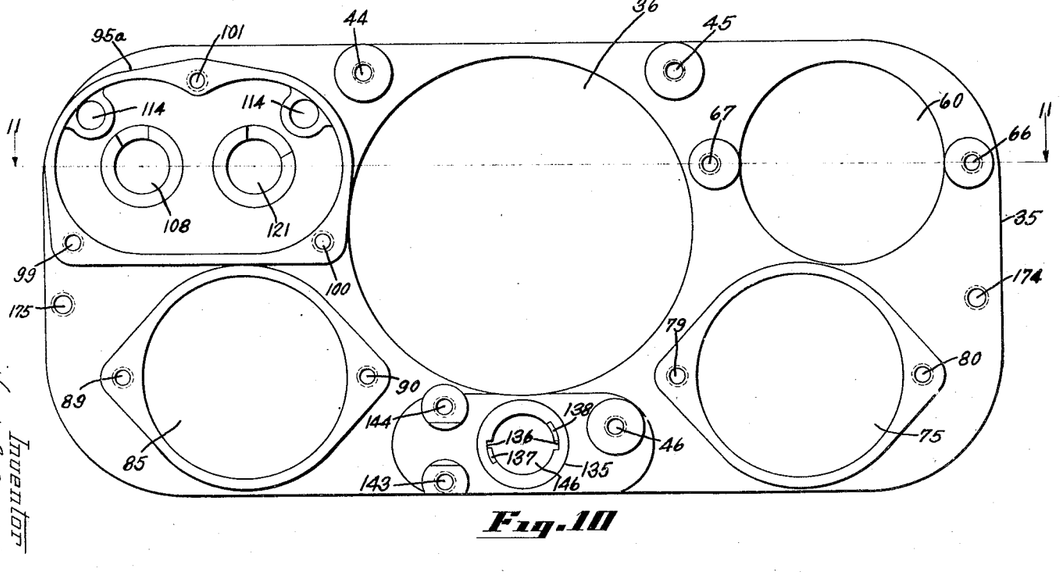
Fig. 10 is a back view of the frame.

A cylindrical flange 135 is provided on the back of frame 35, see Fig. 10. Grooves 136 are provided on the inner surface of this flange 135, and adjacent the rear extremities of these grooves, recessed portions 137 and 138 are provided to form bayonet slots (see Fig. 5). A strip of insulating material 140 (see Fig. 2) is attached to the frame 35 by screws 141 and 142 which engage tapped holes 143 and 144, respectively, in the frame 35. Spring contact strip 145 is attached to the strip 140 in any suitable manner and extends across aperture 146 to a point somewhat beyond the center of said aperture. Terminal 147 is attached to contact strip 145 in any suitable manner, and is adapted for connection with a source of current. An electric bulb 148 of the usual automobile type, preferably about 2 c. p., and provided with the usual retaining pins 149, is inserted into the socket formed by the cylindrical flange 135 from the front thereof, as viewed in Fig. 5, the pins 149 engaging in grooves 136. Inward movement of the bulb is limited by the spring contact strip 145. Then as the bulb is given a slight rotary movement, the pins 149 engage the recessed portions 137 and 138 and the bulb is yieldingly clamped in position by the strip 145. The strip 145 not only tends to clamp the bulb 148 in position within the socket formed by the flange 135, but also conducts current from the terminal 147 to the bulb 148. The lamp 148 is located above the instrument dials and the center of the lamp filament is located between the plane of the rear face of dial cover 32 and the plane of the front face of the frame 35. Aperture 28 in bezel ring 21 is in alignment with aperture 146 in frame 35. A removable cap 150 substantially elliptical in shape is provided with a flanged rim 151 adapted to fit within the aperture 28 formed in bezel ring 21, and rest on the shoulders 29. A flat spring 152 is attached to the inner face of the cap 150 by a rivet 153 which passes through recessed portion 154. This spring 152 is provided with branches 155 having hooked portions 156 adjacent the ends thereof. These hooked portions 156 engage the lower edge of shoulders 29, as viewed in Fig. 13, and yieldingly retain the cap 150 in position with respect to the bezel ring 21. As the cap 150 is pulled outwardly from the bezel ring 21, the shoulders 29 cam the hooked portions 156 of the branches 155 inwardly toward each other thus permitting ready removal of the cap.

Cap 150 is provided with two slots 157 through which arms 158 and 159 respectively, of a medallion 160 are adapted to pass (see Fig. 15). These arms are bent up against the inner surface of the cap 150 so that the medallion is held securely in position. The medallion 160 is adapted to receive the name or trade-mark of the automobile manufacturer to whom the instrument panel is sold.

Cap 150 is provided with a substantially rectangular opening 161 through which light rays are adapted to be directed across the face of the panel for the purpose of lighting the floor of the motor vehicle. Bosses 162 and 163 located on the inner surface of cap 150 are provided with grooves 164 adapted to adjustably receive a thin sheet of mica or other transparent material 165, for closing the opening 161 and for excluding dust. Cap 150 serves to enclose the bulb 148 and prevent accidental breakage thereof.

As shown in Figure 16, the instrument case is adapted for ready attachment to the dash board or instrument board 200 of a motor vehicle by straps 170 and 171 secured to the frame 35 by bolts 172 and 173 respectively, which engage tapped holes 174 and 175 respectively, in frame 35.

The illumination of the various instrument dials and indicator wheels is effected by diffused light. To effect this diffusion of light, the front face of the frame 35 is provided with a relatively good diffusing surface such as white enamel or paint. Likewise the rear face of the dial cover 32 is coated with white enamel for the same purpose. The outer surface of the dial cover 32 is preferably coated with a dull black enamel. The backgrounds of the indicating dials and wheels are preferably coated with a dull black enamel the same as the front face of the dial cover 32. The characters appearing on the indicating dials and wheels are preferably printed in white. This particularly selected combination of colors has been found to be least tiring to the eyes of the observer. The inner surfaces of cap 150 and other inner surfaces of frame 35 which are directly lighted by the bulb 148 are also coated with white paint or enamel. The bulb 148 is so positioned in the frame 35 so that the center of the light filament is located between the plane of the front face of frame 35 and the plane of the rear face of the dial cover 32, in order that the instrument dials may receive maximum illumination. By confining the light rays projected from the bulb within the narrow space between the white enameled surfaces of the front face of the frame and the rear surface of the dial cover, very satisfactory diffusion of light is obtained so that each instrument dial receives a fair share of illumination although some dials are much farther removed from the electric bulb than others. The white numbers or characters on the instrument dials are clearly illuminated by this diffused light and thus are plainly visible through the sight openings in the dial cover 32. Since the background color for the instrument dials is a dull black, there is practically no light reflected to the eyes of the observer except by the white characters. The front face of the dial cover receives no discernible illumination from the light rays emanating through the celluloid pane 165, and, since this front face is painted with a dull black pigment, no light rays will be reflected to the eyes of the observer. Consequently, the observer sees only the white indicating numbers or other characters on what appears to be a substantially continuous black background, the edges of the sight openings in the dial cover being barely noticeable. The glass pane 30 is protected by the dial cover and other parts of the panel or instrument case from illumination of such a character as to cause imperfections in the glass, such as scratches and bubbles, to be discernable. Practically the only light rays which pass through the glass are those rays which are reflected toward the eye of the observer by the particles of white pigment forming the characters on the instrument dials. Therefore observation of the instrument panel is not interfered with by the illumination of imperfections in the glass pane.

It is therefore apparent that the present construction provides for the illumination of a plurality of instrument dials in a manner such as to be the least tiring to the eyes of the observer.

Figure 1:
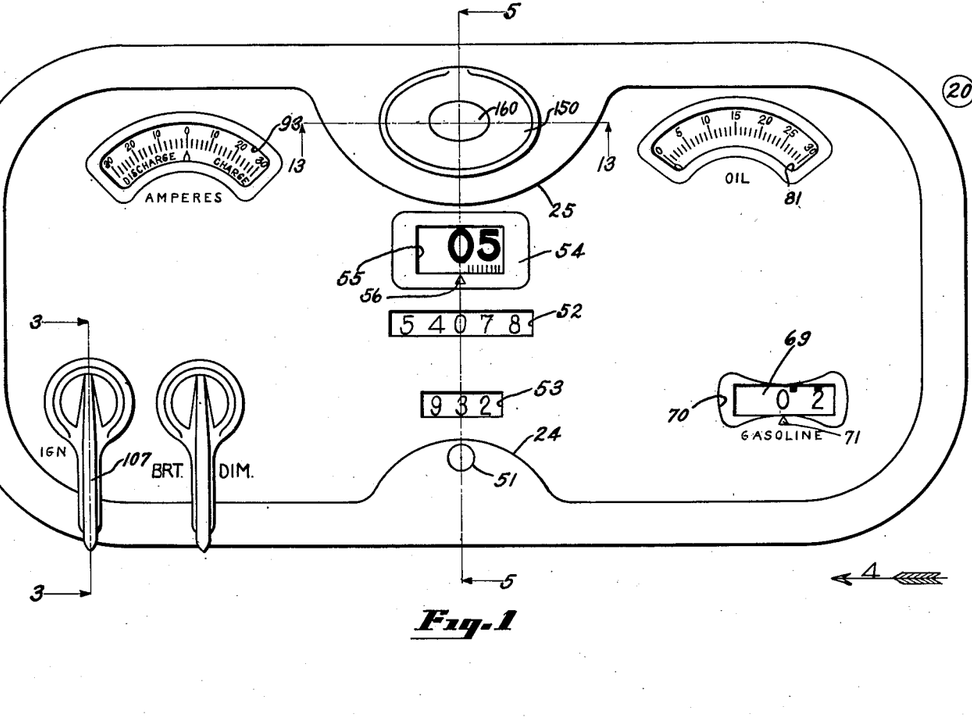
Fig. 1 is a front view of the instrument panel embodying the present invention.
Figure 9:
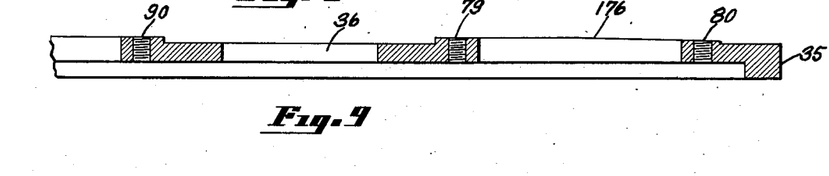
Fig. 9 is a fragmentary sectional view taken on the line 9—9 of Fig. 7.
Figure 11:
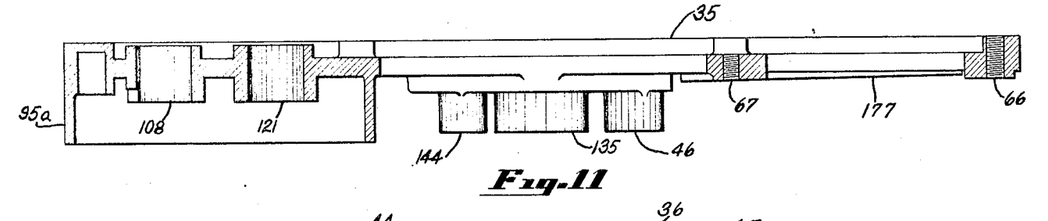
Fig. 11 is a sectional view taken on the line 11—11 of Fig. 10.

In order to properly illuminate those portions of the instrument dials farthest removed from the bulb 148 and consequently the most difficult to illuminate, the frame 35 is provided with tapering surfaces, such as shown in Figs. 9 and 11. In Fig. 9, the tapered surface 176 permits the mounting of the oil gauge in a tilted position with respect to the dial cover 32. That is, the left-hand side of the oil gauge, as viewed in Fig. 1, is tilted upwardly toward the rear surface of the dial cover 32, thus receiving a greater benefit from the diffused light and being more readily visible. In Fig. 11, the tapered surface 177 permits the mounting of the ampere meter in a tilted position with respect to the dial cover 32 for the same purpose.

Some of the light rays from the bulb 148 are thrown up against the surface 180 of bezel ring 21 and against the inner reflecting surfaces of the cap 150 from where they are deflected downwardly, as viewed in Fig. 5, and emitted through the mica window 165. These light rays emerge from the window 165 in a direction forming an acute angle with the plane of the front face of the dial cover 32, and in a direction transverse to the line of vision of the observer. Thus these light rays do not discernably illuminate the front face of the dial cover, and no direct rays of light are thrown into the eyes of the observer. The light emitted through the window is sufficient to light the floor of the motor vehicle, just below the instrument board so as to render visible such devices as the starting switch pedal, and to illuminate dimly the switch handles which project beyond the surface of the glass.

From the above, it will be apparent that there has been provided an illuminated instrument panel comprising a plurality of instruments spaced at varying distances from the lamp, and illuminated apparently in a uniform manner. All of the instruments are mounted within the frame 35 independent of each other, and may be removed or replaced without disturbing the other instruments. The bulb 148 is also mounted independent of the instruments, and is readily removable from the front of the instrument panel by simply removing the cap 150. The instrument panel may be readily removed from the dash board of the motor vehicle by loosening of the bolts 172 and 173 and turning the straps 170 and 171 to a vertical position, as viewed in Fig. 2.

The background and characters are preferably applied to the instrument dials by painting or printing so that the characters are flush with the background. Better illumination can be obtained than in the case where the characters are raised or depressed with respect to the background, a result produced, for example, by etching.

While the form of mechanism herein shown and described constitutes a preferred form of embodiment of the invention, it is to be understood that other forms might be adopted, all coming within the scope of the claims which follow.

I claim:

1. An illuminated instrument panel comprising the combination with a frame; of a plurality of instruments supported by the frame and including indicating dials; an electric lamp for illuminating said dials; and a dial cover provided with sight openings adjacent respective instrument dials; said dials being tilted with respect to the dial cover so that the parts more remote to the lamp are closer to the dial cover.

2. An illuminated instrument panel comprising the combination with a frame and a plurality of instruments including indicating dials carried thereby; of a dial cover provided with a plurality of openings respectively adjacent the instrument dials; a source of light for illuminating the instrument dials without illuminating the front face of the dial cover; and means for directing light rays from said source exteriorly of the instrument panel in a direction forming an acute angle with the plane of the dial cover without illuminating the front of the dial cover.

3. An illuminated instrument panel comprising the combination with a frame; of a plurality of instruments including indicating dials supported by the frame; a part providing an aperture overhanging the front of the instrument panel; a dial cover provided with sight openings adjacent respective instrument dials; and means for illuminating the instrument dials and for directing light rays through said aperture without illuminating the front of the dial cover.

4. An illuminated instrument panel comprising the combination with a frame; of a plurality of instruments including indicating dials supported thereby; a recess provided in said frame; an electric lamp adapted to be supported in said recess and for illuminating said dials; a bezel ring provided with an aperture in alinement with said recess; a removable cap for said aperture provided with reflecting surfaces on the interior thereof and an aperture overhanging the front of the instrument panel through which light rays are directed across the front of the instrument panel.

5. The combination of a casing adapted to be mounted on an automobile, a plurality of instruments mounted in the casing, said casing being arranged to display the dials of the said instruments, a light mounted in the casing, said light being arranged so that the dials of the instruments are illuminated but the eyes of the observer are shielded from direct light rays, said casing being provided with an aperture for the projection of a portion of the light rays for general illumination.

6. In the combination as defined in claim 5, said aperture being arranged at the front of the casing so that the projected rays illuminate the driver's compartment.

7. The combination of a casing adapted to be mounted on an automobile, a plurality of instruments mounted in the casing, a dial cover associated with the casing and provided with apertures for the display of the instrument dials, and a light source arranged to project a portion of its light on the dials at the rear of the dial cover, said cover shielding the eyes of the observer from direct rays from the light source, said casing being apertured for the passage of a portion of the light rays outside of the casing for general illumination.

8. In an automobile, the combination of an instrument panel, a plurality of instruments mounted in the panel, a dial cover associated with the panel and provided with apertures for the display of the instrument dials, and a light source arranged to project a portion of its light on the dials at the rear of the dial cover and another portion downwardly within the driver's compartment for general illumination.

9. In an automobile, the combination of a casing adapted to be mounted in the driver's compartment, an instrument mounted in the casing, a dial cover in the casing apertured for the display of the dial of the instrument, a light bulb receiving housing associated with said casing and having an open outer end, a bulb in said housing arranged to project its light upon said dial at the rear of said dial cover, and a removable cover for the open end of said housing arranged to prevent the passage of direct rays from the bulb into the eyes of the observer and to permit access to said bulb for removal or replacement, said cover being provided with an aperture for the passage of light rays into the driver's compartment for general illumination.

10. The combination of an instrument panel, an instrument mounted on said panel, a light source arranged for the illumination of the dial from the rear of the panel, said instrument dial being arranged at an inclination with the portion of the dial farthest removed from the light source nearest the panel so as to secure substantially uniform illumination of all portions of the dial.

11. In combination with an instrument board having an opening therethrough, an instrument supporting panel closing said opening, and a plurality of instruments supported therein, a detachable finishing plate for said panel, a glass plate covering all of said instruments and said finishing plate, a bezel ring secured to said supporting panel for clamping said glass plate and finishing plate in operative position, and illuminating means supported by said supporting panel and concealed by said finishing plate for illuminating said instruments.

12. In a device for supporting instruments to the instrument board of an automobile, the combination with an instrument supporting plate and a glass cover for said plate, of a finishing plate detachably secured between the face of said plate and said glass, said finishing plate being held in operative position by pressure applied thereto by said glass.

13. An instrument mount for motor vehicles and the like comprising a marginal front frame member and a back frame member adapted to be applied and secured to the rear side of said front frame member, the back member having an aperture for accommodating an instrument with its reading face exposed forwardly through said aperture, said frame extending from the plane of exposure of the instrument face to a plane oblique to and making an acute angle with said plane of exposure, and means for mounting and positioning the face plate at said oblique plane between the two frame members.

14. In the construction as defined in claim 13, foregoing, a glass lodged in the front frame member in front of the face plate therein.

15. An instrument mount for motor vehicles and the like comprising a marginal front frame member and a back frame member adapted to be applied and secured to the rear side of said front frame member, the back member having an aperture for accommodating an instrument with its reading face exposed forwardly through said aperture and extending forwardly from the plane of exposure of the instrument face to a plane oblique to and making an acute angle with said plane of exposure; means for mounting and positioning the glass at said oblique plane between the two frame members, the back frame having means for mounting a lamp with its illuminating zone at the position in the periphery of said frames at which the plane of the instrument face exposure and the plane of the glass are widely separated by reason of the divergence of said planes.

16. An instrument mount for motor vehicles and the like comprising a marginal front frame member and a back frame member adapted to be applied and secured to the rear side of said front frame member, the back member having an aperture for accommodating an instrument with its reading face exposed forwardly through said aperture and extending forwardly from the plane of exposure of the instrument face to a plane oblique to and making an acute angle with said plane of exposure; a face plate at said oblique plane between the two frame members, the back frame having means for mounting a lamp with its illuminating zone at the position in the periphery of said frame at which the plane of instrument face exposure and the plane of face plate are widely separated by reason of the divergence of said plane.

17. An illuminated instrument panel comprising a frame, a plurality of instruments independently supported by the frame and provided with the usual dials, a cover plate apertured for the display of said dials, said cover plate overlying the faces of the instruments and lying closely adjacent thereto, a transparent cover overlying said cover plate, and means for projecting light upon said dials at the rear of the cover plate to produce an indirect lighting effect, said means being so arranged that no direct rays of light fall upon the said transparent cover, said frame being mounted on an automobile dash board, and means associated with the first named means for projecting rays of light downwardly over the face of the dash board, said rays being so directed that none strike the transparent cover.

18. In an instrument panel of the class described, an instrument supporting member comprising an apertured plate, the surface of one portion of which is inclined to the plane of the face of the plate, an instrument secured to said inclined portion and having an indicating face, an electric lamp in juxta-position with said instrument and a housing encasing the sides of said plate, and freely telescopable thereover, one of the walls of the housing having a forwardly disposed extension encasing the said electric lamp.

19. In an instrument panel of the class described, an instrument supporting member comprising an apertured plate, the surface of one portion of which is inclined to the plane of the face of the plate, an instrument secured to the inclined portion having an indicating face, an electric lamp above said instrument and a housing for the plate and instrument encompassing the sides of the plate and the instrument and extending forwardly beyond the marginal edges of the plate forward face, said housing being provided with a portion depending from a forwardly disposed extension of its upper wall to shield the said electric lamp from being struck by extraneous objects.

20. An instrument mount for a motor vehicle and the like comprising an encompassing marginal front frame and a back frame member adapted to be secured together, the back frame member having near one lateral margin a rearwardly protruding hollow boss for mounting a lamp socket, and the front frame having a protrusion in its plane from the inner margin, with an aperture registering with the cavity of the back frame boss; a lamp socket mounted in the back frame member boss, and a reflector hood mounted in the front frame aperture, the back frame member having apertures for accommodating registering instruments with their reading faces exposed at said apertures; a face plate-in-common over all the instruments occupying the entire area of the front frame opening and spaced away from the face of the back frame which has the instrument accommodating apertures, and a glass-in-common covering said face plate-in-common, the face plate and the glass being both mounted in the front frame, the back frame having an aperture at the inner side of the hollow boss opening from the cavity of the boss at the forward or upper end thereof above or forward of the inner end of the socket and laterally with respect to the position of a lamp mounted in the socket, for admitting a beam of light substantially in the plane of the inter-space between the instrument faces mounted in the back member, and the face plate-in-common, for diffusion by back and forth reflection between the facing surfaces of the face plate and back frame member, to illuminate the instrument faces.

21. An instrument panel comprising a back-frame member provided with a plurality of apertures, instruments secured to the back-frame member with their dials exposed at said apertures, said back-frame member being provided with a lamp socket adjacent one margin and a lamp in the socket positioned to illuminate the dials of the instruments, a dial cover overlying said back-frame member provided with apertures to display said dials, a front frame member, transparent means between the front frame member and the back frame member for protecting the dials, said front frame member being apertured in line with said socket, and a cover for said aperture readily removable from the front of the panel to permit access to the bulb.

In testimony whereof I hereto affix my signature.

HARRY E. NORVIEL.